United States Patent [19]

Van Wassenhove

[11] 4,296,941
[45] Oct. 27, 1981

[54] FOLDING GOOSENECK ASSEMBLY

[75] Inventor: Bernard Van Wassenhove, Oklahoma City, Okla.

[73] Assignee: CMI Corporation, Oklahoma City, Okla.

[21] Appl. No.: 63,955

[22] Filed: Aug. 6, 1979

[51] Int. Cl.³ .............................................. B60P 1/04
[52] U.S. Cl. .............................. 280/423 B; 280/425 A; 414/481
[58] Field of Search ........... 280/423 B, 423 R, 425 A; 414/481

[56] References Cited

U.S. PATENT DOCUMENTS

| | | | |
|---|---|---|---|
| 2,611,496 | 9/1952 | Martin | 280/423 B |
| 2,687,225 | 8/1954 | Martin | 414/481 |
| 2,774,613 | 12/1956 | Martin | 280/423 B |
| 4,078,684 | 3/1978 | Hasenberg | 280/423 B |
| 4,103,793 | 8/1978 | Weaver | 280/423 B |
| 4,164,297 | 8/1979 | Dorwin | 280/423 B |

Primary Examiner—John P. Silverstrim
Attorney, Agent, or Firm—Dunlap, Codding & McCarthy

[57] ABSTRACT

An improved folding gooseneck for a load carrying trailer is provided consisting of a forward gooseneck member and a linking assembly. The linking assembly, which pivotably attaches the forward gooseneck member to the frame of a trailer, consists of a combination of a sliding linkage and a non-sliding linkage in which such linkages are positioned so that they form a parallelogram configuration when the gooseneck is in a folded position and a non-parallelogram configuration when the gooseneck is in an unfolded position for use as a loading ramp.

18 Claims, 8 Drawing Figures

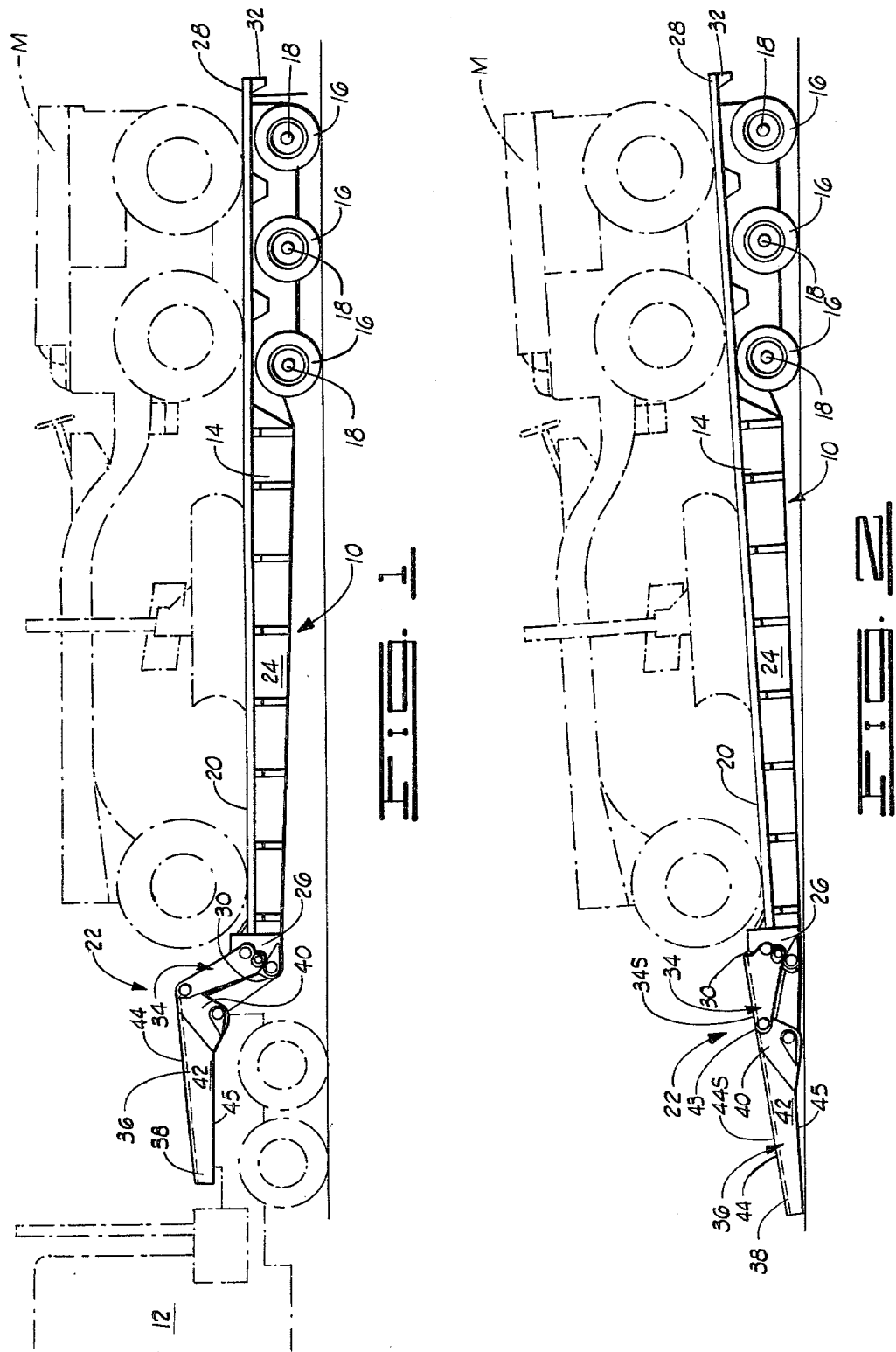

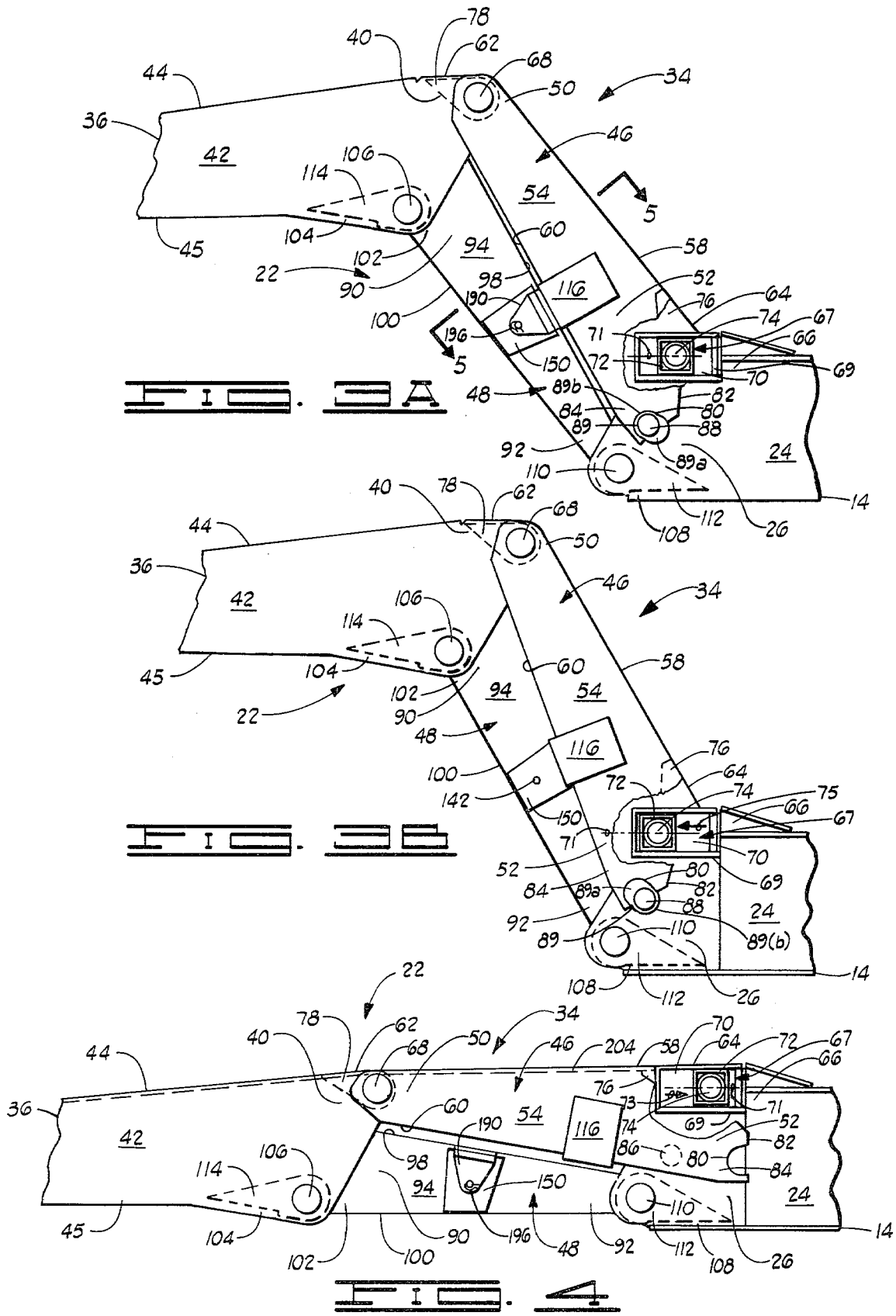

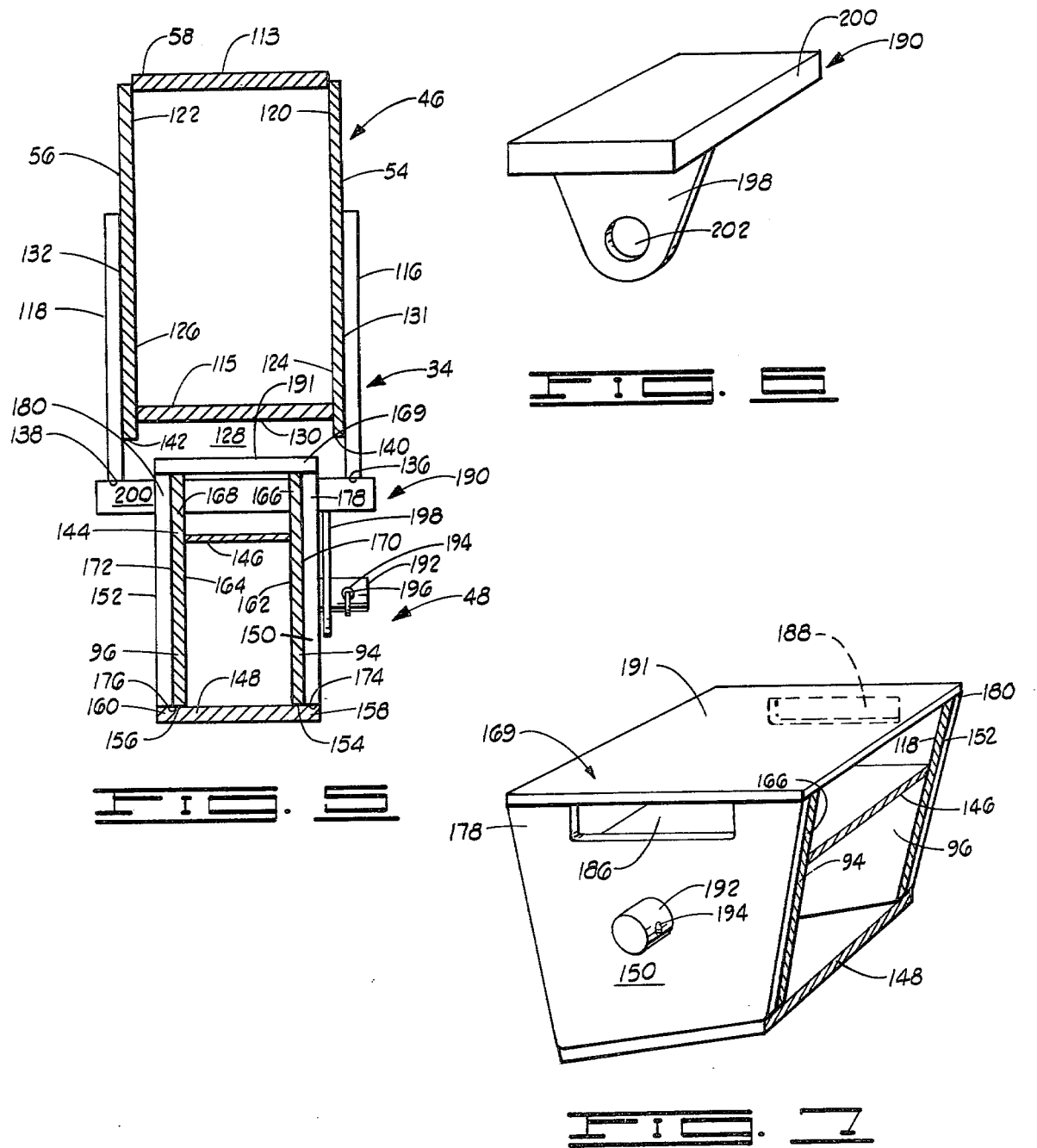

FOLDING GOOSENECK ASSEMBLY

BACKGROUND OF THE INVENTION

1. Field of the Invention

This invention relates generally to trailers and, more particularly to gooseneck trailers employed to move heavy equipment. In one aspect it relates to an improved linkage assembly for use in combination with a forward gooseneck member to form the folding gooseneck. In yet another aspect, it relates to an improved sliding link folding gooseneck assembly having improved capabilities for use as a loading ramp for a trailer when the folding gooseneck assembly is in an unfolded position.

2. Description of the Prior Art

Heretofore trailers, such as lowbed type trailers, have been used to transport heavy equipment from one construction site to another. However, problems of loading heavy equipment on the trailer have often created many difficulties.

In attempts to solve equipment loading problems, the prior art has utilized folding gooseneck trailers, portable loading ramps, or rear-end loading ramps secured to the trailer itself. When employing a folding gooseneck trailer to transport the equipment, the gooseneck is unfolded and extended to the ground so that it may serve as a cargo ramp. Extension into the ramp configuration is made possible by a rigid parallelogram linkage in the gooseneck. However, the nature of this linkage is such that, given the geometrical relations between the trailer bed, the gooseneck, and the ground, it is generally not possible to extend the gooseneck such that a uniformly flat ramp is provided for on-loading and off-loading with consistency. In the area of attachment of the linkage and the upper gooseneck member there will at times be a "hump" in the loading surface which causes the linkage to suffer undue stress during loading and unloading of the trailer. Further, difficulties are at times encountered in moving heavy equipment over the resulting "hump".

The use of portable loading ramps has suffered from several deficiencies, namely the necessity of transporting the portable ramp from site to site along with the heavy equipment thus reducing the payload which the trailer is capable of carrying; or, the portable loading ramp must be moved by a separate vehicle which is expensive, time consuming and, many times, not available when needed. In addition, safety factors are often lacking in the use of such portable ramps due to slippage of the ramp and the like.

Another means for loading heavy equipment on trailers used in the prior art consists of securing a loading ramp to the rear end portion of the trailer. This allows one to lower the ramp and thereafter drive the equipment up onto the bed of the trailer. However, such equipment is often bulky in nature, complicated in construction, and substantially reduces the payload of equipment which the trailer can transport from site to site.

Thus, none of the prior art ramp assemblies have fully met the requirement of a safe, economical, durable, light-weight loading means for loading heavy equipment onto trailers. New and useful loading techniques and apparatus are constantly being sought which do not suffer from the disadvantages of the prior art devices. Further, such devices should be economical to manufacture, durable in construction, relatively maintenance free and be so designed and constructed to become a part of the trailer without substantially reducing the payload of equipment which the trailer is designed to carry.

Therefore, an object of the present invention is to provide an improved loading ramp for a trailer which is an integral part of the trailer but does not substantially reduce the equipment carrying capabilities of the trailer.

Another object of the invention is to provide an improved loading ramp which is durable in construction, economical to manufacture, substantially maintenance free and does not suffer from the disadvantages of other prior art devices.

These and other objects, advantages, and features of the present invention will become apparent to those skilled in the art from a reading of the following detailed description when read in conjunction with the accompanying drawings which illustrate the invention.

BRIEF DESCRIPTION OF THE DRAWINGS

FIG. 1 is a side elevational view of a typical low bed heavy duty trailer having the gooseneck of the trailer in a folded position using the linkage assembly of the present invention.

FIG. 2 is a side elevational view of a typical low bed heavy duty trailer having the gooseneck of the trailer in an unfolded position for use as a loading ramp employing the linkage assembly of the present invention.

FIG. 3A is an enlarged, partially broken, side elevational view of a portion of the gooseneck in a folded position depicting the linkage assembly of the present invention having a height adjusting member positioned thereon.

FIG. 3B is an enlarged, partially broken, side elevational view of a portion of the gooseneck in a folded position depicting the linkage assembly of the present invention without the height adjusting member depicted in FIG. 3A.

FIG. 4 is an enlarged, partially broken, side elevational view of a portion of the gooseneck in an unfolded position for use as a loading ramp employing the linkage assembly of the invention.

FIG. 5 is an enlarged cross-sectional view of the linkage assembly of FIG. 3A taken along the line 5—5.

FIG. 6 is an enlarged perspective view of the substantially L-shaped height adjusting member shown in FIG. 5.

FIG. 7 is an enlarged perspective view of a side extending means for the lower linkage member of the linkage assembly depicted in FIG. 5.

DETAILED DESCRIPTION OF THE INVENTION

Referring to the drawings, and particularly to FIGS. 1 and 2, semi-trailer 10 is operatively connected to tractor 12 by a conventional fifth wheel. Semi-trailer 10 comprises trailer frame 14 mounted on wheels 16 by axles 18, load support structure or bed 20 and folding gooseneck assembly 22. Axles 18 and support structure or bed 20 are secured to trailer frame 14 by any suitable means well known in the art.

Trailer frame 14 includes two opposed sides 24 (only one being depicted) having a forward end 26 and a rearward end 28, a front end 30 interconnecting the two opposed sides 24 at their forward ends 26 and a rearward end 32 interconnecting the two opposed sides 24 at their rearward ends 28. Folding gooseneck assembly 22 is pivotably attached to the forward ends 26 of the two opposite sides 24 as will hereinafter be described in detail.

Folding gooseneck assembly 22 consists of linkage assembly 34 and forward gooseneck member 36. Forward gooseneck member 36 is provided with a forward end 38 having a connector (not shown) for operatively connecting the forward end 38 of the forward gooseneck member 36 to the fifth wheel of the tractor unit 12; and forward gooseneck member 36 further comprises a rearward end 40, two opposed sides 42 (only one being shown), an upper portion 44, and a lower portion 45.

Linkage assembly 34 pivotably connects the rearward end 40 of sides 42 of the forward gooseneck member 36 to the forward ends 26 of sides 24 of the trailer frame 14. Thus, the forward gooseneck member 36 and linkage assembly 34 cooperate to enable one to position the gooseneck assembly 22 in a folded, pulling position as depicted in FIG. 1; or, in an unfolded, extended position for use as a loading ramp for the trailer as shown in FIG. 2. As will be described in more detail hereinafter with reference to other drawings, the unique structure and design of the linkage assembly 34 enables one to unfold the gooseneck assembly 22 and downwardly extend the forward gooseneck member 36 to form a ramp which does not contain a "hump" at the position 43 which is the point of attachment of the rearward end 40 of the forward gooseneck member 36 to the linkage assembly 34. That is, the present invention affords means to extend the gooseneck assembly 22 so that the top surface 44S of the upper portion 44 and the top surface 34S of a plate that is supported on top of the linkage assembly 34 are substantially coplanar, as shown in FIG. 2. This provides a generally continuous ramp surface for the loading and unloading of equipment such as depicted by the working machine M depicted in phantom lines.

The folding gooseneck assembly 22 desirably consists of two linkage assemblies 34 for pivotably connecting the opposed sides 42 of the rearward end 40 of the forward gooseneck member 36 to the forward ends 26 of the opposed sides 24 of the trailer frame 14. However, since the two linkage assemblies 34 are substantially identical, only one of such linkage assemblies 34 and its pivotable attachment to one side 42 of the rearward end 40 of the forward gooseneck member 36 to the forward end 26 of side 24 of the trailer frame 14 will be described.

Referring now to FIGS. 3A, 3B, 4 and 5, one of the linkage assemblies 34 is set forth. For the purpose of simplifying the drawing, the top plate which is supported by and between the two parallel linkage assemblies 34 has been omitted in FIG. 5. Each linkage assembly 34 comprises a first or upper linkage member 46 and a second or lower linkage member 48. The unique structure, placement and pivotable attachment of the linkage members 46 and 48 to the rearward end 40 of side 42 of the forward gooseneck member 36 and the forward end 26 of side 24 of the trailer frame 14 of the semi-trailer 10 allows linkage members 46 and 48 to form a linkage assembly having a parallelogram configuration when the forward gooseneck member 36 and the linkage assembly 34 are in a folded position, and a linkage assembly having a non-parallelogram configuration when the forward gooseneck member 36 and the linkage assembly 34 are in an unfolded position.

First linkage member 46, depicted as an elongated, triangular shaped linkage member (in FIGS. 3A, 3B and 4) includes a forward end 50, e.g. apex, a rearward end 52, e.g. base, a first side 54, a second side 56, an upper surface 58 and a lower surface 60. The first linkage member 46 is pivotably secured at the forward end 50 to the upper portion 62 of the side 42 of the rearward end 40 of the forward gooseneck member 36 by a pin 68; and at its upper portion 64 of its rearward end 52 to the upper portion 66 of the forward end 26 of side 24 of the trailer frame 14 through a camming assembly 67 in such a manner as to allow a floating to and fro movement of the first linkage member 46 with respect to the side 24 of the trailer frame 14.

The floating to and fro movement of the first linkage member 46 with respect to side 24 of the trailer frame 14, at the point of pivotable attachment, is accomplished by the camming assembly 67 which includes a housing 69 having an elongated opening 70 of generally rectangular shaped configuration therein, the housing 69 being secured to upper portion 66 of the forward end 26 of side 24 of the trailer frame 14 as shown; a cam 72 of generally hollow, square shaped configuration which is slidably positioned within the elongated opening 70 of the housing 69; and a pin 74. One end portion of the pin 74 is operably disposed in the hollow of the cam 72 and the other end portion of the pin 74 extends outwardly therefrom and is pivotably secured to the upper portion 64 of the rearward end 52 of the first linkage member 46 to thereby pivotably connect the rearward end 52 of the first linkage member 46 to the forward end 26 of side 24 of the trailer frame 14.

The square shaped cam 72 is sized so as to allow unrestricted movement of the cam 72 within the rectangular shaped opening of the housing 69 in a direction 73 towards the rearward end 32 of the trailer frame 14 when the folding gooseneck assembly 22 is being lowered to an unfolded position, and in a direction 75 towards the front end 30 of the trailer frame 14 when the folding gooseneck assembly 22 is being positioned in a folded position. The housing 69 containing the rectangularly shaped opening 70 can be provided by components which are integral parts of the trailer frame 14, or the housing 69 containing the opening 70 can be provided via the cam 72 as a separate unit which is securely affixed to the forward end 26 of side 24 of the trailer frame 14. The elongated opening 70 of the housing 69 of the camming assembly 67 has a longitudinal axis 71 which is substantially parallel to the longitudinal axis of the trailer frame 14.

The forward end 50 of the first linkage member 46 is pivotally secured to the upper portion 62 of side 42 of the rearward end 40 of the forward gooseneck member 36 with a pin 68 by providing an aperture (not shown) within the forward end 50 of the first linkage member 46 which is aligned with an aperture (not shown) in the upper portion 62 of side 42 of the rearward end 40 of the forward gooseneck member 36 and the positioning of the pin 68 therein. Because of the stress placed upon the folding gooseneck assembly 22, especially at the points of pivotable attachment of the first linkage member 46 to the forward portion 26 of the trailer frame 14 when employing the folding gooseneck assembly 22 as a loading ramp, reinforcing members 76 and 78 are secured to the upper portion 64 of the rearward end 52 of the first linkage member 46 and to the upper portion 62 of the side 42 of the rearward end 40 of the forward gooseneck member 36, respectively, as shown by the phantom lines, at the place of pivotable attachment of the first linkage member 46 to the forward end 26 of side 24 of the trailer frame 14 and the rearward end 40 of the forward gooseneck member 36 as hereinabefore set forth.

The first linkage member 46 is further provided with a recessed area 80 in the rearward edge 82 of the lower portion 84 of its rearward end 52. The recessed area 80 is of a sufficient size so that when the first and second linkage members 46 and 48 are in a folded position, as depicted in FIGS. 3A and 3B, the recessed area 80 is substantially aligned with an aperture 86 (shown in phantom in FIG. 4) within the forward end 26 of side 24 of the trailer frame 14 so that the recessed area 80 and the aperture 86 can receive a retaining pin 88. Retaining pin 88 is provided at one end thereof with a cam 89. The cam 89, an elongated member having a substantially oval configuration, is positioned within the recessed area 80 and stabilizes the linkage assembly 34 in the folded position and prevents undesired movement of the linkage assembly 34 during transporting of the trailer. Since the linkage assembly 34 can be positioned in several folded positions, such as depicted in FIGS. 3A and 3B, cam 89 is secured to the end of the pin 88 in an offset position thereby providing the cam 89 with an enlarged first end portion 89(a) and a smaller opposed second end portion 89(b).

The second linkage member 48, also depicted in FIGS. 3A, 3B and 4 as an elongated triangular shaped linkage member, includes a forward end 90, e.g. base, a rearward end 92, e.g. apex, a first side 94, a second side 96, an upper surface 98 and a lower surface 100. The second linkage member 48 is pivotably secured at a lower portion 102 of its forward end 90 to a lower portion 104 of the side 42 of the rearward end 40 of the forward gooseneck member 36 by a pin 106; and, at its rearward end 92 to a lower portion 108 of the forward end 26 of side 24 of the trailer frame 14 by a pin 110 as shown in the drawing.

The forward end 90 of the second linkage member 48 is pivotably secured to the lower portion 104 of the side 42 of the rearward end 40 of the forward gooseneck member 36 by providing an aperture (not shown) in the lower portion 102 of the forward end 90 of the second linkage member 48 which can be aligned with an aperture (not shown) in the lower portion 104 of the side 42 of the rearward end 40 of the forward gooseneck member 36 and the positioning of the pin 106 within the aligned apertures. The rearward end 92 of the second linkage member 48 is pivotably secured to the lower portion 108 of the forward end 26 of side 24 of the trailer frame 14 by providing an aperture (not shown) in the rearward end 92 of the second linkage member 48 which can be aligned with an aperture (not shown) in the lower portion 108 of the forward end 26 of side 24 of the trailer frame 14 and the positioning of a pin 110 within the aligned apertures.

As previously stated, because of the stress placed upon the folding gooseneck assembly at the point of pivotable attachment of the first and second linkage members 46 and 48 to the trailer frame 14 and to the forward gooseneck member 36 when the folding gooseneck assembly 22 is used as a loading ramp, reinforcing members 112 and 114 are secured to the lower portion 108 of the forward end 26 of side 24 of the trailer fame 14 and to the lower portion 104 of side 42 of the rearward end 40 of the forward gooseneck member 36, respectively, as shown by the phantom lines, to reinforce the places of pivotable attachment of the second linkage member 48 as hereinbefore described.

The pivotable attachment of the first linkage member 46 to the upper portion 62 of the side 42 of the rearward end 40 of the forward gooseneck member 36 and to the upper portion 66 of the forward end 26 of side 24 of the trailer frame 14 is in an off-set relationship with respect to the point of pivotable attachment of the second linkage member 48 to the lower portion 104 of the side 42 of the rearward end 40 of the forward gooseneck member 36 and to the lower portion 108 of the forward end 26 of side 24 of the trailer frame 14. The purpose for such off-set relationship between the first linkage member 46 and the second linkage member 48 of the linkage assembly 34 will now be explained with reference to FIGS. 5, 6 and 7, in combination with FIGS. 3A, 3B and 4.

Second linkage member 48 is constructed so as to have a smaller cross-sectional outside width than the cross-sectional interior width of the first linkage member 46. Such sizing, in cooperation with the pivotable attachment of each of the linkage members 46 and 48 to the rearward end 40 of the forward gooseneck member 36 and to the forward end 26 of side 24 of the trailer frame 14 in an off-set relationship, enables one, with certain minor modifications and components, to provide for stabilization of the linkage assembly 34 when same is in its folded position, while at the same time, allowing one to easily and effectively adjust the overall height of the folding gooseneck assembly 22 to facilitate in connecting same to a towing vehicle.

The first and second linkage members 46 and 48, depicted in FIGS. 1–4 as having a triangular configuration, are shown in FIG. 5 as being formed of a multi-plate construction. Because of the great stress which can be placed on the first and second linkage members 46 and 48 by the weight of the equipment being loaded onto the semitrailer 10, it has been found desirable to construct the first and second linkage members 46 and 48 so as to have a substantially trapezoid configuration in which the two parallel sides of the trapezoid configuration have the triangular configuration. By fabricating the first and second linkage members 46 and 48 from multiple plates, which are secured together by any suitable means, such as welding, to form a unit having a hollow center, the linkage assembly 34 has sufficient strength to withstand stress placed upon it during the loading operation and yet does not substantially increase the weight of the trailer.

Referring more particularly to FIGS. 5, 6 and 7, the first linkage member 46 comprises the first side 54, the second side 56, an upper member 113, a lower member 115 and side extension members 116 and 118. Upper member 113 is secured to upwardly extending interior surfaces 120 and 122 of the first and second sides 54 and 56, respectively, so that the first and second sides 54 and 56 of the first linkage member 46 are maintained in a substantially parallel, spaced relationship. Lower member 115 is secured to lower extending interior surfaces 124 and 126 of the first and second sides 54 and 56, respectively, so as to form a recessed area 128 between the lower extending interior surfaces 124 and 126 of the first and second sides 54 and 56 and lower surface 130 of lower member 115. Side extension members 116 and 118 are secured to exterior surfaces 131 and 132 of the first and second sides 54 and 56, such that respectively, lower edges 136 and 138 of side extension members 116 and 118 are disposed an equal distance beyond lower extending edges 140 and 142 of the first and second sides 54 and 56 thereby enlarging recessed area 128 and increasing the height of the first linkage member 46.

Second linkage member 48 is constructed similar to the first linkage member 46. However, as previously stated, the second linkage member 48 has a smaller cross-sectional outside width than the cross-sectional interior width of the first linkage member 46 so that the upper portion of the second linkage member 48 can be positioned within the recessed area 128 of first linkage member 46 described above when the folding gooseneck assembly 22 is in the folded position as depicted in FIG. 3B.

The second linkage member 48 comprises the first side 94, the second side 96, an upper member 146, a lower member 148 and side reinforcing members 150 and 152. The lower member 148 is secured to lower edges 154 and 156 of the first and second sides 94 and 96, respectively, so as to maintain the first and second sides 94 and 96 in a parallel, spaced relationship and to form outwardly extending shoulders 158 and 160. Upper member 146 is secured to the interior surfaces 162 and 164 of the first and second sides 94 and 96 near upwardly extending end portions 166 and 168 of the first and second sides 94 and 96, respectively.

Side reinforcing members 150 and 152 are secured to a portion of the exterior surfaces 170 and 172 of the first and second sides 94 and 96, respectively, of the second linkage member 46 so that lower edges 174 and 176 of side extension members 150 and 152 abut the upper surface of shoulders 158 and 160, respectively, and are supported thereupon. Opposed upwardly extending ends 178 and 180 of side reinforcing members 150 and 152 extend upwardly a distance substantially equal to the upwardly extending end portions 166 and 168 of the first and second sides 94 and 96. A support plate 169 is secured to the upwardly extending ends 178 and 180 of side reinforcing member 150 and 152, respectively, and the upwardly extending end portion 166 and 168 of the first and second sides 94 and 96, respectively, as shown in FIGS. 5 and 7. An elongated slot 186 is formed through the side reinforcing member 150 and the side 94; and, an elongated slot 188 is formed through the side reinforcing member 152 and the side 96. The elongated slots 186 and 188 are aligned with each other and are adapted to slidably receive an adjusting member 190. Secured to the side reinforcing member 150, at a position below the elongated slot 186, is a pin 192.

The pin 192 is of a generally cylindrical configuration and is provided with a bore 194 extending therethrough for receiving a removable retaining pin 196. The pin 192 cooperates with the elongated opening 186 in side reinforcing member 150 and side 94, and the elongated opening 188 of the side reinforcing member 152 and the side 96 to secure the adjusting member 190 in place.

The adjusting member 190 is depicted as a substantially L-shaped member comprising a first leg member 198 and a second leg member 200. The first leg member 198, the vertically disposed leg member, is provided with an aperture 202 therein thus allowing the adjusting member 190 to be slidably positioned upon the pin 192 of the side reinforcing member 150. The leg member 200 of the adjusting member 190, the substantially horizontally disposed leg member, is of sufficient length to receive and support the lower extending edges 136 and 138 of the side extension members 116 and 118 of the first linkage member 46 when the leg member 200 is positioned within the elongated slot 186 of the side reinforcing member 150 and the first side 96 and the elongated slot 188 of the side reinforcing member 152 and the second side 96 of the second linkage member 48. The adjusting member 190, in combination with the first linkage member 46 and the second linkage member 48, enables one to adjust the height of the hitch unit attached to the forward end 38 of the forward gooseneck member 36 thus facilitating the connection of same to the towing vehicle.

Referring now to FIG. 3A, in combination with FIG. 5, the first linkage member 46 is positioned in a first position with relation to the second linkage member 48 by adjusting member 190 as described above. However, when the adjusting member 190 is removed, as depicted in FIG. 3B, the first linkage member 46 is positioned in a second position with relation to the second linkage member 48. In the second position, an upper side or surface 191 of the plate 169 of the second linkage member 48 abuts the lower surface 130 of the lower member 115 of the first linkage member 46 and thus supports the first linkage member 46. In both the first and second position the retaining pin 88 is positioned within the aperture 80 of the trailer frame 14 and the cam 89, secured to one end portion of the pin 88, is positioned within the recessed area 80 in the rearward edge 82 of the lower portion 84 of the rearward end 52 of the first linkage member 46 so that the cam 89 supports the first linkage member 46 in the desired position. As is shown in FIG. 3A, when the first linkage member 46 is positioned in the first position with respect to the second linkage member 48, the smaller opposed second end portion 89b of the cam 89 contacts the first linkage member 46 through the recessed area 80 to support and stabilize the first linkage member 46; whereas, when the first linkage member 46 is positioned in the second position with respect to the second linkage member 48, as shown in FIG. 3B, the enlarged first end portion 89a of the cam 89 contacts the first linkage member 46 through the recessed area 80 to support and stabilize the first linkage member 46.

As is evident to those skilled in the art, in order for the folding gooseneck assembly 22 of the present invention to be employed as a loading ramp, the forward gooseneck member 36 and the linkage assembly 34 should have a width substantially corresponding to the width of the trailer frame 14. Such can be readily accomplished by employing two linkage assemblies 34 of the invention to pivotably connect the rearward end 40 of each side 42 of the forward gooseneck member 36 to the forward end 26 of each side 24 of the trailer frame 14. Thereafter, the two linkage assemblies 34 can be joined by securing a load support plate 204 to the upper surface 58 of each of the first linkage members 46, such being shown in phantom in FIG. 4. The folding and unfolding of gooseneck assembly 22 can readily be accomplished through the use of a winch or the like employing techniques well known in the art.

While the subject invention has been described in terms of certain preferred embodiments, and illustrated by certain drawings, such are intended for illustrative purposes only and alternatives or equivalents may readily occur to those skilled in the art without departing from the spirit or scope of the invention as set forth in the appended claims.

What is claimed is:

1. An improved linkage assembly for use with a folding gooseneck trailer having a forward gooseneck member and a load carrying means, said forward gooseneck member having a forward end portion and a rearward end portion, the rearward end portion including an upper portion and a lower portion, said load carrying means having a forwardly extending end portion and a rearward end portion, said linkage assembly operably connecting the forward end portion of the load carrying means to the rearward end portion of the forward gooseneck member, said improved linkage assembly comprising:

a. first linkage means for connecting the forward gooseneck member to said load carrying means, said first linkage means having a forward end portion and an opposed rearward end portion, the forward end portion of the first linkage means pivotally secured to the upper portion of the rearward end portion of said forward gooseneck member;

b. camming means operatively connecting the opposed rearward end portion of said first linkage means to the forwardly extending end portion of said load carrying means, said camming means being pivotally connected to the opposed rearward end portion of said first linkage means and connected to said forwardly extending end portion of said load carrying means for permitting sliding movement of said first linkage means along a longitudinal axis which is substantially parallel to the longitudinal axis of said load carrying means, said camming means comprising:
   1. a housing having an elongated opening therein;
   2. a cam positionable within the elongated opening of said housing for movement along the longitudinal axis of said housing; and
   3. a pin having said cam operatively connected thereto so that one end portion of said pin extends outwardly from said housing and said cam, the outwardly extending end portion of said pin pivotally secured to the rearward end portion of said first linkage means;

c. second linkage means for connecting the forward gooseneck member to said load carrying means, said second linkage means having a forward end portion and an opposed rearward end portion, the forward end portion of said second linkage means pivotally secured to the lower portion of the rearward end portion of said forward gooseneck member at a position below the pivotal attachment of said forward end portion of said first linkage means, the opposed rearward end portion of the second linkage means pivotally secured to the forwardly extending end portion of said load carrying means at a position below and forward the slidable attachment of said rearward end portion of said first linkage means to said load carrying means; and d. linkage assembly stabilizing means operatively connected to the rearward end portion of said first linkage means and the forward portion of said load carrying means for securing said first linkage means in a first position when the forward gooseneck member and the linkage assembly are in a first folded position and said linkage assembly stabilizing means is in a first position, said linkage assembly stabilizing means securing said first linkage means in a second position when the forward gooseneck member and the linkage assembly are in a second folded position and said linkage assembly stabilizing means is in a second position, said first and second linkage means cooperating to form a linkage assembly substantially having a parallelogram configuration when the forward gooseneck member and linkage assembly are in one of the first and second folded positions, and said first and second linkage means cooperating to form a linkage assembly having a non-parallelogram configuration when the forward gooseneck member and linkage assembly are in an unfolded position.

2. The improved linkage assembly according to claim 1 wherein said linkage assembly stabilizing means comprises:

a recessed area formed in the lower portion of the rearward end portion of the first linkage means;

an aperture in the forwardly extending end portion of the load carrying means;

a pin member having a first end and an opposed second end; and a substantially oval shaped cam member secured to the first end of said pin member in a off-center position so as to provide said cam member with an enlarged first end portion and a smaller opposed second end portion, the opposed second end of said pin member slidably positionable within the aperture of said load carrying means, the cam member cooperating with the recessed area in said first linkage means so that in a first position the enlarged first end portion of said cam member is disposed within the recessed area of said first linkage means and secures the first linkage means in the first position, and in a second position the smaller opposed second end portion of said cam member is disposed within the recessed area of the first linkage means and secures the first linkage means in the second position.

3. The improved linkage assembly according to claim 2 wherein the forward end portion of said second linkage means is pivotably attached to said forward gooseneck member at a position below and forward the position of pivotable attachment of said first linkage means to said forward gooseneck member, and in the first folded position said second linkage means supportly abutts said first linkage means.

4. The improved linkage according to claim 2 wherein said second linkage member is pivotably attached to said load carrying means and said forward gooseneck member in an off-set spaced relationship with respect to the attachment of said first linkage means to said forward gooseneck member and said load carrying means, said first linkage means is provided with a larger inside width than the outside width of said second linkage means, and said first linkage means is provided with an elongated recess in a lower side facing an upper side of said second linkage means which is adapted to receive the upper side of said second linkage means when said forward gooseneck member and linkage assembly are in the first folded position.

5. The improved linkage assembly according to claim 4 wherein said first linkage means furhter includes a first extension means for increasing the height of said first linkage means and for enlarging the depth of the recessed area in the lower side of said first linkage means, side first side extension means comprising:

a first extension member secured to one side of said first linkage means; and, a second extension member secured to a second opposed side of said first linkage means, said first and second extension members being positioned to extend downwardly from the first and second opposed sides of said first linkage means and equal distance.

6. The improved linkage assembly according to claim 5 wherein said second linkage means further includes first side reinforcing means for increasing the strength of said second linkage means, said first side reinforcing means comprising:
 a first reinforcing member secured to one side of said second linkage means;
 a second reinforcing member secured to a second opposed side of said second linkage means; and,
 a plate member secured to an upper end of said first and second reinforcing members, said first and second reinforcing members being positioned to extend upwardly a distance substantially equal to the first and second opposed sides of said second linkage means so that the first and second reinforcing members and the plate member secured thereto are positionable within the enlarged recess area in the lower side of said first linkage means so as to supportingly abut the lower side of said first linkage means when said forward gooseneck member and said linkage assembly are in the first folded position.

7. The improved linkage assembly according to claim 6 wherein said first and second reinforcing members and said first and opposed second opposed sides of said second linkage means are each provided with an elongated slot, the slot in said first reinforcing member and said first side member being substantially aligned with the slot in said second reinforcing member and the opposed second opposed side, and wherein said linkage assembly further comprises:
 an adjusting means slideably positionable within the elongated slots for supportingly abutting the first and second extension members of said first side extension means when said forward gooseneck member and said linkage assembly are in the second folded position.

8. The improved linkage assembly according to claim 7 wherein said adjusting means comprises:
 a substantially L-shaped member having a vertically disposed first leg and a horizontally disposed second leg, said first leg having an aperture therein and said second leg slideably positionable with the elongated slots and adapted to supportingly abut the first and second extension members of said first extension means; and,
 wherein said first side reinforcing member of said second linkage means further includes a pin member secured thereto and extending outwardly therefrom, said pin member having a substantially cylindrical configuration and adapted to be slideably positioned within the aperture of said first leg of said L-shaped member, said pin member further being provided with a bore extending therethrough; and
 pin means slideably positionable within the bore of said pin member for securing said first leg of said L-shaped member thereon.

9. The improved linkage assembly according to claim 8 wherein said linkage assembly comprises a first and a second linkage assembly operatively connected to said load carrying means and said forward gooseneck member, said second linkage assembly being maintained in a parallel, spatial relationship with said first linkage assembly, and wherein said linkage assembly further includes a load support means for interconnecting the first linkage means of said first and second linkage assemblies and for providing a platform for the loading of a vehicle onto said load carrying means.

10. A trailer comprising:
 a. a frame;
 b. ground engaging wheels secured to the upper surface of said frame;
 c. load supporting assembly secured to the upper surface of said frame;
 d. a gooseneck assembly having a forward gooseneck member, one end of the gooseneck member having means for connecting same to a towing vehicle; and
 e. a linkage assembly pivotally connecting the other end portion of said forward gooseneck member to said frame, said linkage assembly comprising:
  1. first linkage means for connecting the forward gooseneck member to said frame, the first linkage means having a forward end portion and an opposed rearward end portion, the forward end portion being pivotally secured to an upper, rearward portion of said forward gooseneck member;
  2. camming means operatively connecting the opposed rearward end portion of said first linkage means to a forwardly extending portion of said frame, said camming means being pivotably connected to said rearward end portion of said first linkage means and connected to said forward extending portion of said frame for permitting sliding movement of said first linkage means along a longitudinal axis which is substantially parallel to the longitudinal axis of said frame, said camming means comprising:
   (a) a housing having an elongated opening therein;
   (b) a cam positionable within the elongated opening of said housing for movement along the longitudinal axis of said housing; and
   (c) a pin having said cam operatively connected thereto so that one end portion of said pin extends outwardly from said housing and said cam, the outwardly extending end portion of said pin pivotally secured to the rearward end portion of said first linkage means;
  3. second linkage means for connecting the forward gooseneck member to said load carrying means, said second linkage means having a forward end portion and an opposed rearward end portion, the forward end portion being pivotably secured to the lower rearward portion of said forward gooseneck member at a position below the pivotable attachment of said forward end portion of said first linkage means, the opposed rearward end portion of the second linkage means pivotably secured to the forward extending portion of said frame at a position below and forward the slidable attachment of said rearward end portion of said first linkage means to said frame; and
  4. linkage assembly stabilizing means operatively connected to the rearward end portion of said first linkage means and the forward portion of said frame for securing said first linkage means in a first position when the forward gooseneck member and the linkage assembly are in a first folded position and said linkage assembly stabilizing means is in a first position, said linkage assembly stabilizing means securing said first linkage means in a second position when the forward gooseneck member and the linkage assembly are in a second folded position and said linkage assembly stabilizing means is in a second position, said first and second linkage means cooperating to form a linkage assembly substantially having a parallelogram configuration when the forward gooseneck member and linkage assembly are in one of the first and second folded positions and a linkage assembly having a non-parallelogram configuration when the forward gooseneck member and linkage assembly are in an unfolded position.

11. The trailer according to claim 10 wherein said linkage assembly stabilizing means further comprises:
a recessed area formed in the lower rearward end portion of the first linkage means;
an aperture in the forwardly extending end of the trailer;
a pin member having a first end and an opposed second end; and
a substantially oval shaped cam member secured to the first end of said pin member in a off-center position so as to provide said cam member with an enlarged first end portion and a smaller opposed second end portion, the opposed second end of said pin member slidably positionable within the aperture of said frame means, the cam member cooperating with the recessed area in said first linkage means so that in a first position the enlarged first end portion of said cam member is disposed within the recessed area of said first linkage means and secures the first linkage means in the first position, and in a second position the smaller opposed second end portion of said cam member is disposed within the recessed area of the first linkage means and secures the first linkage means in the second position.

12. The trailer according to claim 11 wherein the forward end portion of said second linkage means is pivotably attached to said forward gooseneck member at a position below and forward the position of pivotable attachment of said first linkage means to said forward gooseneck member, and in the first folded position said second linkage means supportly abutts said first linkage means.

13. The trailer according to claim 11 wherein said frame is pivotably attached to said load carrying means and said forward gooseneck member in an off-set spaced relationship with respect to the attachment of said first linkage means to said forward gooseneck member and said frame, said first linkage means is provided with a larger inside width than the outside width of said second linkage means, and said first linkage means is provided with an elongated recess in a lower side facing an upper side of said second linkage means which is adapted to receive the upper side of said second linkage means when said forward gooseneck member and linkage assembly are in the first folded position.

14. The trailer according to claim 13 wherein said first linkage means further includes a first extension means for increasing the height of said first linkage means and for enlarging the depth of the recessed area in the lower side of said first linkage means, said first side extension means comprising:
a first extension member secured to one side of said first linkage means; and,
a second extension member secured to a second opposed side of said first linkage means, said first and second extension members being positioned to extend downwardly from the first and second opposed sides of said first linkage means and equal distance.

15. The trailer according to claim 14 wherein said second linkage means further includes second side reinforcing means for accepting a height adjusting means and said second side reinforcing means comprising:
a first reinforcing member secured to one side of said second linkage means;
a second reinforcing member secured to a second opposed side of said second linkage means; and,
a plate member secured to an upper end of said first and second reinforcing members, said first and second reinforcing members being positioned to extend upwardly a distance substantially equal to the first and second opposed sides of said second linkage means so that the first and second reinforcing members and the plate member secured thereto are positionably within the enlarged recess area in the lower side of said first linkage means so as to supportingly abut the lower side of said first linkage means when said forward gooseneck member and said linkage assembly are in the first folded position.

16. The trailer according to claim 15 wherein said first and second reinforcing members and said first and opposed second sides of said second linkage means are each provided with an elongated slot, the slot in said first extension member and said first side member being substantially aligned with the slot in said second reinforcing member and the opposed second side, and wherein said linkage assembly further comprises:
an adjusting means slideably positionable within the elongated slots for supportingly abutting the first and second extension members of said first side extension means when said forward gooseneck member and said linkage assembly are in the second folded position.

17. The trailer according to claim 16 wherein said adjusting means comprises:
a substantially L-shaped member having a vertically disposed first leg and a horizontally disposed second leg, said first leg having an aperture therein and said second leg slideably positionable with the elongated slots apertures of said first and second side reinforcing member of said second linkage means and adapted to supportingly abut the first and second extension members of said first extension means;
wherein said first side reinforcing member of said second linkage means further includes a pin member secured thereto and extending outwardly therefrom said pin member having a substantially cylindrical configuration and adapted to be slideably positioned within the aperture of said first leg of said L-shaped member, said pin member further being provided with a bore extending therethrough; and
pin means slideably positionable within the bore of said pin member for securing said first leg of said L-shaped member thereon.

18. The trailer according to claim 17 wherein said linkage assembly comprises a first and a second linkage assembly operatively connected to said frame and said forward gooseneck member, said second linkage assembly being maintained in a parallel, spatial relationship with said first linkage assembly, and wherein said linkage assembly further includes a load support means for interconnecting the first linkage means of said first and second linkage assemblies and for providing a platform for the loading of a vehicle onto said load supporting surface of the trailer.

* * * * *

UNITED STATES PATENT AND TRADEMARK OFFICE
CERTIFICATE OF CORRECTION

PATENT NO. : 4,296,941
DATED : October 27, 1981
INVENTOR(S) : Bernard Van Wessenhove It is certified that error appears in the above-identified patent and that said Letters Patent are hereby corrected as shown below:

In column 6, line 65, the words "such that" should be placed after the word "respectively" to read as --respectively, such that--.

In column 10, line 58, the word "furhter" should be --further--.

Signed and Sealed this

Sixteenth Day of March 1982

|SEAL|

Attest:

GERALD J. MOSSINGHOFF

Attesting Officer

Commissioner of Patents and Trademarks